Dec. 9, 1969     B. B. JOFFE ET AL     3,483,375
BETA-RAY MEASURING PROBE AND ALIGNMENT STRUCTURE
Filed Dec. 23, 1965
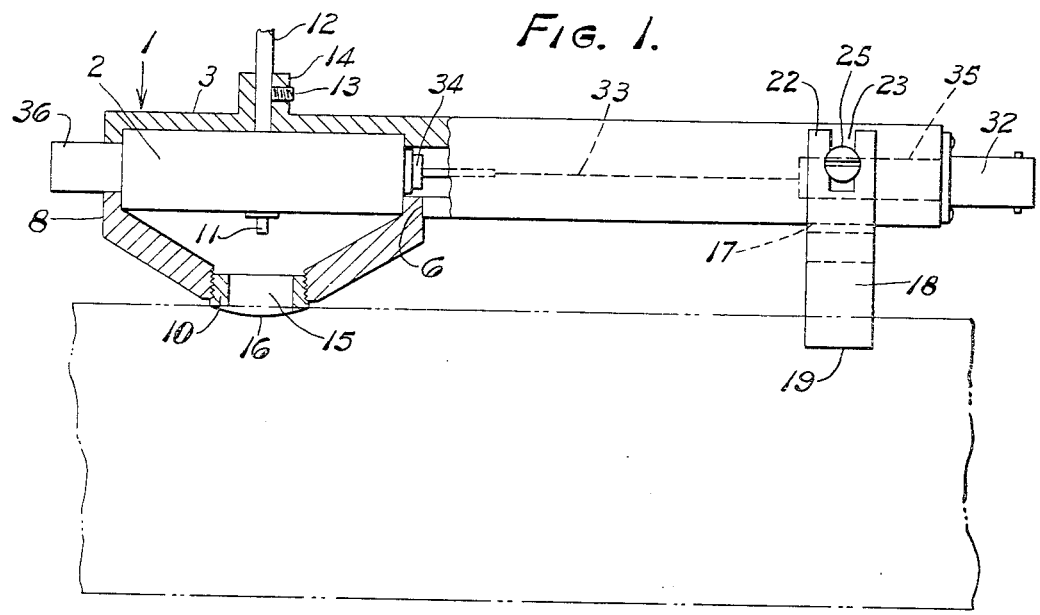
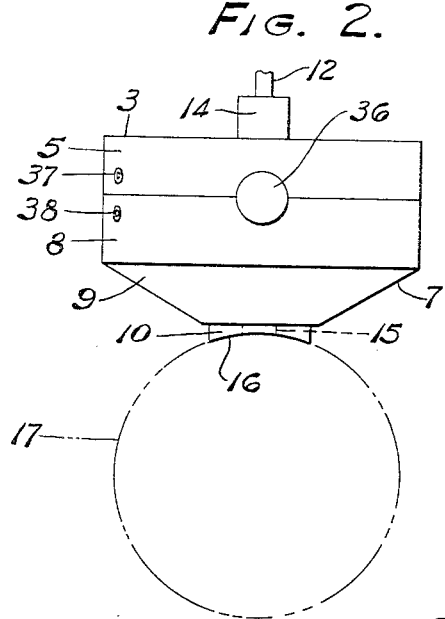
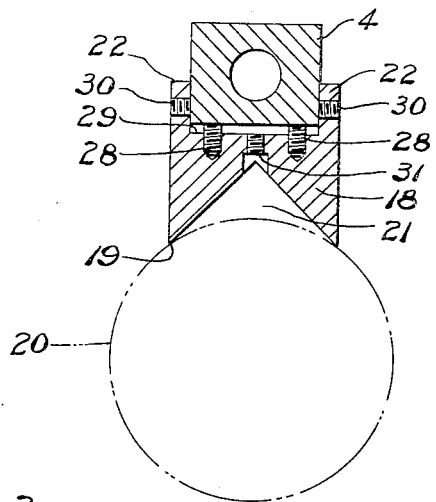
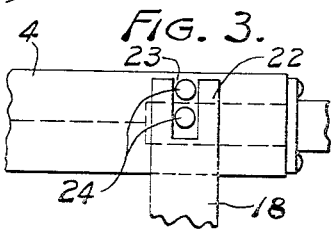
INVENTOR.
BORIS B. JOFFE &
JOHN E. TIEBOR

# United States Patent Office 3,483,375
Patented Dec. 9, 1969

3,483,375
BETA-RAY MEASURING PROBE AND
ALIGNMENT STRUCTURE
Boris B. Joffe, Buffalo, and John E. Tiebor, Tonawanda,
N.Y., assignors to Twin City Testing Corporation,
Tonawanda, N.Y.
Filed Dec. 23, 1965, Ser. No. 515,986
Int. Cl. H01j 39/00; G21h 5/00
U.S. Cl. 250—83
9 Claims

ABSTRACT OF THE DISCLOSURE

A had at one end of an arm contains a radiation emitting source and a radiation detector, the head having a cover receiving interchangeable platens. An alinement support block extends from the arm in spaced relation to the head, the block engaging a supporting surface for maintaining the platen in abutting relation with the area under test. The block provides stable support on curved as well as flat surfaces, and is adjustable relative to the arm for varying the height of the arm above the support surface.

---

This invention relates to a new and useful portable probe and alignment support therefor adapted for use in the measurement of coating thickness by radiation techniques.

It is known that when beta rays hit a body a certain portion of them are reflected. The intensity of the reflected beta rays is a function of the atomic number of the body. If the body is coated, the intensity of beta ray backscatter will be proportional to the thickness of the coating. Therefore, such beta ray backscatter can be used to measure the thickness of coatings, and this measurement technique offers many advantages particularly in the measurement of ultra-thin coatings.

However, accuracy in the measurement of relatively small areas requires that the area under test be no larger than the exposure opening through which radiation passes to and from the test area, and that the measuring probe abut the test area around the exposure opening. This delimits the area under test and effectively removes it as a variable.

United States Patent 3,115,577 discloses a measuring probe eminently suitable for such measurements, the probe having a platen for supporting an article under test in abutting relation therewith, and the platen being removable for substitution of another platen having an exposure opening of different size or shape.

The probe specifically disclosed in said patent is in the form of a table primarily intended for use with test objects which can be brought to the table and supported thereon during testing. Where the probe must be brought to the object under test, as in the case of relatively large or inaccessible objects, a further problem arises because the probe must be held against the test area in a manner maintaining the requisite abutting relation. Where the probe is held by hand, this means that the person holding the probe must be very careful in what he is doing. It also means that he is occupied in holding the probe and is not free to do other things while the measurements are being made.

Accordingly, a primary object of this invention is to provide a portable measuring probe particularly adapted for use with beta ray measurement techniques and adapted to be held against the surface under test, with means for supporting the probe in properly abutting relation to the surface under test.

Another object of this invention is to provide a portable measuring probe as aforesaid with support means providing for adjustment to properly align the probe head with the test surface.

It is also an object of this invention to provide such a probe and support means therefor adapted for positioning and self-support on curved as well as flat surfaces.

A further object of this invention is to provide the foregoing in a relatively simple and inexpensive construction.

The foregoing and other objects, advantages and characterizing features of this invention will become clearly apparent from the ensuing detailed description of an illustrative embodiment and modification, reference being made to the accompanying drawing depicting the same wherein like reference numerals denote like parts throughout the various views and wherein:

FIG. 1 is a view, partly inside elevation and partly in longitudinal section, of a portable probe and alignment support of this invention;

FIG. 2 is an end elevational view thereof;

FIG. 3 is a fragmentary, elevational view showing the side of the alignment support opposite that shown in FIG. 1; and FIG. 4 is a transverse sectional view through another form of alignment support means.

Referring now in detail to the accompanying drawing, there is shown a portable measuring probe generally designated 1 having a radiation detector in the form of a G–M tube 2 of the pancake type. Such tubes are known, being disclosed for example in Patent 3,115,577, and per se form no part of the present invention. Tube 2 is received within a circular head having a body part 3 at one end of an elongated arm 4 integral therewith. Arm 4 has a passage therethrough for the necessary electrical connections utilized in conjunction with tube 2, the end of arm 4 opposite body part 3 being closed by a removable socket 32 of conventional design. Such electrical connections include a lead 33 connected to the anode 34 of tube 2, and to a resistor 35, the cathode of tube 2 being shown at 36.

Body part 3 has a side wall 5 providing a shallow, cup-like cavity for tube 2. Arm 4, beyond wall 5, terminates in a vertical, arcuate shoulder 6 aligned with body part 3 to accommodate a removable cover part 7 wall 5. Skirt 8 encircles tube 2, fitting between tube 2 having an annular skirt 8 generally concident with side and shoulder 6 in abutting relation to wall 5. Cover 7 also has a frusto-conical end portion 9 extending from skirt 8 and provided with an internally threaded socket for an externally threaded platen 10.

A beta radiation source holder is provided in the form of a cup 11 opening toward platen 10 and adapted to contain radiation emitting material. A stem 12 extends from cup 11 through a central opening in tube 2, as described in Patent 3,115,577, and is held in adjusted position relative to tube 2 and platen 10 as by a set screw 13 in boss 14 on body part 3. The window of tube 2 faces toward platen 10, and side wall 5 and skirt 8 have opposed, semi-circular recesses accommodating cathode 36. Tube 2 is held in body part 3 as by a set screw 37 through side wall 5, and cover part 7 is releasably secured to tube 2 as by a set screw 38 through skirt 8.

Platen 10 has an exposure aperture 15 opening therethrough, and an article engaging surface 16 conforming to the shape of the test specimen. For example, if the test area is an external convex surface such as provided by the cylinder indicated at 17, the external surface 16 of platen 10 would be concavely shaped about an axis parallel to the axis of cylinder 17 to snugly abut the external surface thereof. Conversely, if the test area is the internal concave surface of a tubular section, the external surface 16 of platen 10 would be correspondingly convexly shaped to snugly abut the internal surface of the tubular section. Platen 10 is removable, for substitution of platens having different exposure aperture shapes and sizes, and different surfaces 16.

Such abutment in conjunction with selection of a platen having an exposure aperture 15 commensurate with the area available for test, so as not to exceed the same, is critical if accuracy is desired, because it delimits the test area and eliminates the same as a variable during measurement thereof.

Probe 1 can be held with cover 7 and platen 10 facing upwardly, and with the test specimen supported by platen 10. However, it is a particular feature of this invention that probe 1 can be positioned in the necessary abutting relation against the test specimen, in a manner leaving the operator's hands free. To this end, there is provided an alignment support block 18 engaging arm 4 in spaced relation to platen 10. Two important features of alignment block 18 are the provision for adjusting the spacing of arm 4 from the surface engaged by block 18, and the surface engaging structure of alignment block 18 which adapts it for stabilization of the probe. This latter feature is common to both forms of spacing adjustment shown in FIGS. 3 and 4, and is provided by laterally spaced surface engaging portions 19 adapted to rest upon a stable support surface indicated at 20 in FIG. 4. In the illustrated embodiment, surface 20 is a portion of the cylinder 17 under test, the support area engaged by block 18 being spaced from the test area engaged by platen 10. However, it could be any stable support in the vicinity of the test area.

In the illustrated embodiment, the laterally spaced portions 19 are formed by a recess 21 of inverted V form cut in the bottom of block 18. Portions 19 and platen 10 together provide a three point support, and this configuration is especially useful since it provides a stable support on both convexly and concavely curved surfaces, as well as on a flat surface. Accordingly, it is not necessary to provide different alignment blocks for different stabilizing support surfaces.

The embodiment of FIG. 3 shows an alignment block 18 having oppositely disposed, upwardly extending sides 22, each of which has a vertically extending slot 23 open at the upper end. Vertically spaced guide pins 24 carried by arm 4 project laterally from one side thereof for close fitting, sliding engagement in one of the slots 23. A screw 25 extends through the other slot 23 into a tapped hole in the side of arm 4 shown in FIG. 1, and has an enlarged head for releasable clamping engagement against that side 22 of block 18. Arm 4 can be adjusted vertically in block 18 and then releasably locked in adjusted position relative to the surface engaging portions 19 by loosening screw 25 and sliding guide pins 24 and screw 25 within slots 23 to the desired height and then threading screw 25 into clamping engagement with the side 22 of block 18. Guide pins 24 maintain arm 4 and block 18 in right angular relation during such adjustment, thereby maintaining the desired coplanar relation between platen surface 16 and portions 19.

In the embodiment of FIG. 4, set screws 28 are threadably received in the bottom wall 29 of the arm receiving recess in block 18, and set screws 30 are threadably received in sides 22. Arm 4 rests on set screws 28, and thereby can be raised and lowered relative to block 18 to a greater or lesser extent as desired, by threading set screws 28 into and out of wall 29. Block 18 also can be moved lengthwise of arm 4, toward and away from platen 10. Arm 4 is locked in adjusted position between sides 22 of block 18 by tightening set screws 30.

Block 18 also can have a tapped opening 31 for a lock screw, not shown, adapted to engage a similar tapped opening, not shown, in arm 4.

In use, assuming that it is desired to measure the thicknesses of a coating on an external cylindrical surface as shown in FIG. 1, a platen 10 is selected having a test area engaging surface 16 corresponding in curvature to the curvature of the test area. The selected platen 10 is inserted in the probe head, and the probe is positioned with platen 10 abutting the surface under test. Alignment block 14 is disposed with its stabilizing portions 19 in direct contact with cylinder 17, and screw 25 (or screws 30, as the case may be) is loosened. Arm 4 is moved relative to block 18 until surface 16 of platen 10 is in flush abutting relation to the test surface. Screw 25 then is tightened, and the probe is ready for use.

Support member 18 maintains the surface engaging portion 16 of platen 10 in abutting relation to the test area, and maintains the angular relation between the probe head and the test area during successive measurements. In this way, accuracy is maintained even where the article engaging surface of the platen does not precisely fit the surface of the article under test and as a result some leakage occurs. Moreover, constant abutting and angular relation is maintained during the time interval required for each radiation count, thereby precluding erroneous radiation count due to displacement of such surfaces during each count.

It will be understood that radiation sources other than a beta radiation source may be utilized in the practice of the present invention and the reference to beta radiation throughout the specification is intended to be by way of example only. Also, holder 11 can be removed from the probe for replacement by another holder containing a different source material.

Accordingly, it is seen that this invention fully accomplishes its intended objects. There is provided an alignment support for supporting a fully portable probe on a test surface, the probe being adjustable relative to the support for precise alignment with the test surface and to accommodate different platens.

The foregoing detailed description is intended to be illustrative only, and it is intended to include within the scope of the appended claims those variations and modifications which will naturally suggest themselves to those skilled in the art.

Having fully disclosed and completely described our invention, and its mode of operation, what we claim as new is:

1. A probe for use in conjunction with the measuring of thickness utilizing radiation techniques comprising, in combination, a probe head, an arm extending from said head, a platen carried by said head, said piston having an exposure aperture therethrough and being adapted to abut a test area, a radiation source carried by said head adapted to emit radiation through said aperture, a radiation detector carried by said head, and surface engaging support means extending from said arm in spaced relation therealong from said head for maintaining said platen in abutting relation with the area under test.

2. A probe according to claim 1 including a radiation source holder, and means adjustably mounting said holder on said head for selectively spacing said radiation source from said aperture.

3. A probe according to claim 1 wherein said platen is removably carried by said head for substitution of platens having test area abutting surfaces of different configurations.

4. A probe according to claim 1 wherein said support means includes a base portion adapted to seat on a supporting surface, the position of said arm relative to said base portion being adjustable, and means for securing said arm in adjusted position.

5. A probe according to claim 1 wherein said support means includes an arm engaging surface and adjustable means carried by said support means engaging said arm for selectively spacing said arm from said surface.

6. A probe according to claim 5 wherein said support means includes a support member having laterally spaced projections adapting said member in supporting engagement on surfaces of various configurations.

7. A probe according to claim 1 wherein said support means includes a support member having a recess therein for receiving said arm and adjustable means carried by said member and engaging said arm for positioning said arm within said recess.

8. A probe according to claim 1 wherein said support means includes a support block having side wall portions defining a recess for receiving said arm, at least one of said wall portions having a slot therethrough and adjustable means engaging said arm and said side wall portion extending through said slot for selectively positioning said arm within said recess.

9. A probe according to claim 1 wherein said support means includes a support member having side wall portions defining a first recess for receiving said arm, and adjustable means engaging said arm and said member for selectively positioning said arm within said recess, said block having projecting portions thereon defining a second recess therebetween adapting said member for support on surfaces of various configurations.

References Cited
UNITED STATES PATENTS

| | | |
|---|---|---|
| Re. 22,531 | 8/1944 | Hare. |
| 2,967,938 | 1/1961 | McKay et al. |
| 3,143,886 | 8/1964 | Lippke. |

ARCHIE R. BORCHELT, Primary Examiner

U.S. Cl. X.R.

250—105, 106